(12) United States Patent
Ranganathan

(10) Patent No.: US 11,201,746 B2
(45) Date of Patent: Dec. 14, 2021

(54) BLOCKCHAIN ACCESS CONTROL SYSTEM

(71) Applicant: Accenture Global Solutions Limited, Dublin (IE)

(72) Inventor: Sridhar Ranganathan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 232 days.

(21) Appl. No.: 16/529,343

(22) Filed: Aug. 1, 2019

(65) Prior Publication Data

US 2021/0036860 A1    Feb. 4, 2021

(51) Int. Cl.
*H04L 9/32*       (2006.01)
*G06F 21/62*    (2013.01)
*H04L 29/06*    (2006.01)

(52) U.S. Cl.
CPC .......... *H04L 9/3234* (2013.01); *H04L 9/3247* (2013.01); *H04L 9/3297* (2013.01); *G06F 21/62* (2013.01); *H04L 9/3236* (2013.01); *H04L 63/08* (2013.01); *H04L 2209/38* (2013.01)

(58) Field of Classification Search
CPC ... H04L 9/3234; H04L 9/3247; H04L 9/3297; H04L 63/08; H04L 9/3236; H04L 2209/38; H04L 63/00; H04L 9/3239; H04L 63/102; G06F 21/62
See application file for complete search history.

(56) References Cited

U.S. PATENT DOCUMENTS

| | | | |
|---|---|---|---|
| 5,534,855 A | 7/1996 | Schockley et al. | |
| 6,108,783 A | 8/2000 | Krawczyk et al. | |
| 6,292,897 B1 | 9/2001 | Gennaro et al. | |
| 7,730,319 B2 | 6/2010 | Razman et al. | |
| 9,436,923 B1 | 9/2016 | Sriram et al. | |
| 9,667,416 B1 | 5/2017 | Machani et al. | |
| 9,679,276 B1 | 6/2017 | Cuende | |
| 9,774,578 B1 | 9/2017 | Ateniese et al. | |

(Continued)

OTHER PUBLICATIONS

David Treat, "Editing the Uneditable, Blackchain needs to adapt to an imperfect world," Retrieved from the Internet on Dec. 13, 2019, pp. 1-3, published online by Accenture at URL https://www.accenture.com/in-en/insight-editing-uneditable-blockchain.

(Continued)

*Primary Examiner* — Christopher A Revak
(74) *Attorney, Agent, or Firm* — Crowell & Moring LLP

(57) ABSTRACT

A system may receive a credential token and an access command. The access command may identify access logic to modify a datablock stored in a blockchain. The credential token may be mapped to a role token included in a role-based access control model. The system may determine a role-based access control framework authorizes the access command by identifying an authorization token in the role-based access control model, and the system may determine the role token is mapped to the identified authorization token in the role-based access control model. The system may determine the datablock includes the identified authorization token. The system may validate the identified authorization token. The system may authorize execution of the access logic to modify the datablock in response to the access command being authorized by the role-based access control framework, and validation of the identified authorization token included in the datablock.

21 Claims, 5 Drawing Sheets

(56) References Cited

U.S. PATENT DOCUMENTS

| | | | |
|---|---|---|---|
| 9,785,369 | B1 | 10/2017 | Ateniese et al. |
| 9,959,065 | B2 | 5/2018 | Ateniese et al. |
| 9,967,088 | B2 | 5/2018 | Ateniese et al. |
| 9,967,096 | B2 | 5/2018 | Ateniese et al. |
| 2002/0013898 | A1 | 1/2002 | Sudia et al. |
| 2002/0099946 | A1 | 7/2002 | Herbert et al. |
| 2002/0164033 | A1 | 11/2002 | Rajasekaran |
| 2002/0194209 | A1 | 12/2002 | Bolosky et al. |
| 2004/0107341 | A1 | 6/2004 | Hall et al. |
| 2007/0223706 | A1 | 9/2007 | Gantman et al. |
| 2007/0226514 | A1 | 9/2007 | Maletsky |
| 2007/0294205 | A1 | 12/2007 | Xu et al. |
| 2008/0104407 | A1 | 5/2008 | Horne et al. |
| 2008/0195583 | A1 | 8/2008 | Hsu et al. |
| 2009/0006853 | A1 | 1/2009 | Li |
| 2009/0024848 | A1 | 1/2009 | Takasugi et al. |
| 2009/0193256 | A1 | 7/2009 | Takenaka et al. |
| 2009/0271631 | A1 | 10/2009 | Teranishi |
| 2010/0005306 | A1 | 1/2010 | Izu et al. |
| 2010/0037056 | A1 | 2/2010 | Follis et al. |
| 2010/0046749 | A1 | 2/2010 | Hatano et al. |
| 2010/0110935 | A1 | 5/2010 | Tamassia et al. |
| 2010/0153732 | A1 | 6/2010 | Su |
| 2010/0169653 | A1 | 7/2010 | Takenaka et al. |
| 2011/0137916 | A1 | 6/2011 | Deen et al. |
| 2012/0072732 | A1 | 3/2012 | Canard et al. |
| 2014/0245020 | A1 | 8/2014 | Buldas et al. |
| 2015/0006899 | A1 | 1/2015 | Seo et al. |
| 2015/0025934 | A1 | 1/2015 | Mashima et al. |
| 2015/0046337 | A1 | 2/2015 | Hu et al. |
| 2015/0121062 | A1 | 4/2015 | Gajek et al. |
| 2015/0128283 | A1 | 5/2015 | Mashima et al. |
| 2015/0207625 | A1 | 7/2015 | Sathaye et al. |
| 2015/0244690 | A1 | 8/2015 | Mossbarger |
| 2015/0332283 | A1 | 11/2015 | Witchey |
| 2015/0332395 | A1 | 11/2015 | Walker et al. |
| 2015/0356555 | A1 | 12/2015 | Pennanen |
| 2015/0378842 | A1 | 12/2015 | Tomlinson et al. |
| 2016/0027229 | A1 | 1/2016 | Spanos et al. |
| 2016/0085955 | A1 | 3/2016 | Lerner |
| 2016/0110261 | A1 | 4/2016 | Parab et al. |
| 2016/0110292 | A1 | 4/2016 | Choi et al. |
| 2016/0125403 | A1 | 5/2016 | Hu et al. |
| 2016/0162897 | A1 | 6/2016 | Feeney |
| 2016/0191243 | A1 | 6/2016 | Manning |
| 2016/0204942 | A1 | 7/2016 | Bohli et al. |
| 2016/0212109 | A1 | 7/2016 | Hird |
| 2016/0212146 | A1 | 7/2016 | Wilson |
| 2016/0218879 | A1 | 7/2016 | Ferrin |
| 2016/0292396 | A1 | 10/2016 | Akerwall |
| 2016/0321654 | A1 | 11/2016 | Lesavich et al. |
| 2016/0328424 | A1 | 11/2016 | Borley et al. |
| 2016/0330034 | A1 | 11/2016 | Back et al. |
| 2016/0344737 | A1 | 11/2016 | Anton et al. |
| 2016/0358135 | A1 | 12/2016 | Liao et al. |
| 2016/0358165 | A1 | 12/2016 | Maxwell |
| 2017/0031676 | A1 | 2/2017 | Cecchetti et al. |
| 2017/0034217 | A1 | 2/2017 | Anton et al. |
| 2017/0046693 | A1 | 2/2017 | Haldenby et al. |
| 2017/0046806 | A1 | 2/2017 | Haldenby et al. |
| 2017/0048217 | A1 | 2/2017 | Biggs et al. |
| 2017/0109735 | A1 | 4/2017 | Sheng et al. |
| 2017/0132630 | A1 | 5/2017 | Castinado et al. |
| 2017/0163733 | A1 | 6/2017 | Grefen et al. |
| 2017/0180134 | A1 | 6/2017 | King |
| 2017/0213209 | A1 | 7/2017 | Dillenberger |
| 2017/0220815 | A1 | 8/2017 | Ansari et al. |
| 2017/0279774 | A1 | 9/2017 | Booz et al. |
| 2017/0330174 | A1 | 11/2017 | Demarinis |
| 2018/0006831 | A1 | 1/2018 | Toll et al. |
| 2018/0218003 | A1 | 8/2018 | Banga et al. |
| 2018/0268382 | A1* | 9/2018 | Wasserman ........ G06Q 20/0655 |
| 2019/0268319 | A1* | 8/2019 | Kurian ................ H04L 63/083 |
| 2020/0134139 | A1* | 4/2020 | Vaish .................... G06F 21/335 |
| 2020/0371965 | A1* | 11/2020 | Medvedeva .......... H04L 9/3226 |

OTHER PUBLICATIONS

Richard Lumb et al., "Why distributed ledger technology must adapt to an imperfect world," Accenture—Editing Uneditable Blockchain, Retrieved from the Internet on Dec. 13, 2019, pp. 1-8, published online by Accenture at URL https://www.accenture.com/_acnmedia/PDF-33/Accenture-Editing-Uneditable-Blockchain.pdf#zoom=50.

Accenture's "*Editable Blockchain Prototype Draws Criticism,*" CryptoCoinsNews, cryptocoinsnews.com, Sep. 28, 2016, pp. 1-3.

Ateniese, G. et al., "A Provably Secure Nyberg-Rueppel Signature Variant with Applications," International Association for Cryptologic Research IACR) ePrint, 2004, pp. 1-17.

Ateniese, G. et al., "Sanitizable Signatures," European Symposium on Research in Computer Security, 2005, LNCS 3679, pp. 159-177, Springer-Verlag Berlin, Heidelberg, 2005.

Ateniese, Giuseppe et al., "*On the Key Exposure Problem in Chameleon Hashes, Security in Communication Networks,*" (SCN) 2004, Lecture Notes in Computer Science, vol. 3352, Springer, Berlin, Heidelberg, pp. 1-16.

Ateniese, Giuseppe, et al., "*Identity-Based Chameleon hash and Applications,*" FC 2004, LNCS, vol. 3110, Springer-Verlag (2004), pp. 164-180.

Birch, D., "*Mutable and Immutable Blackchain,*" LinkedIn.com, Nov. 2, 2016, pp. 1-14.

Decker, Christian et al., "*Bitcoin, transaction Malleability and MtGox, Network and Parallel Computing,*" Springer International Publishing, Cham, Switzerland, vol. 8713 (2014), pp. 313-326.

Essentially Optimal Robust Secret Sharing with Maximal Corruptions, Nov. 5, 2015, Cryptology ePrint Archive, pp. 1-38.

Goodman, L.M., "Tezos: A Self-Amending Crypto-Ledger Position Paper," Aug. 3, 2014 (2014).

Juels, A, et al., "*PORs: Proofs of Retrievability for Large Files,*" in ACM Conference on Computer and Communications Security, CCS 2007, pp. 584-597. ACM.

Larimer, D., "*Momentum—A Memory-Hard Proof-of-Work via Finding Birthday Collisions,*" Invictus Innovations Inc., Tech. Rep., Oct. 2013.

Moore, C., "*How Accenture Hacked the Blockchain,*" LinkedIn.com., Nov. 2, 2016, pp. 1-14.

Puddu, Ivan, et al., "*μchain: How to Forget without Hard Forks,*" https://www.airbnb.com and https://gitlab.inf.ethz.ch/puddui/fabric, dated Feb. 10, 2017, (21p).

Rabin, T., "*Verifiable Secret Sharing and Multiparty Protocols with Honest Majority,*" (Extended Abstract), STOC '89 Proceedings of the Twenty-First Annual ACM Symposium on Theory of Computing, Association for Computing Machinery (ACM) Digital Library, May 14-17, 1989, pp. 73-85.

Rass, S., "*Dynamic Proofs of Retrievability From Chameleon-Hashes,*" in SECRYPT '13. SciTePress, 2013, pp. 296-304.

Zheng, Q, et al., "*Fair and Dynamic Proofs of Retrievability,*" In Proceedings of the first ACM Conference on Data and Application Security and Privacy, CODASPY, 2011, New York, NY, USA. ACM, pp. 237-248.

Zyskind, Guy, et al., "*Enigma: Decentralized Computation Platform with Guaranteed Privacy,*"guyz@mit.edu, oznathan@gmail.com, pentland@mit.edu, Jun. 6, 2015, (14p).

Giuseppe Ateniese et al., "Redactable Blockchain—or—Rewriting History in Bitcoin and Friends", International Association for Cryptologic Research,, vol. 20170214:204959, Feb. 14, 2017 (Feb. 14, 2017), p. 1-38.

International Search Report for International Application No. PCT/RU2017/000866, dated Jul. 19, 2018.

Written Opinion of the ISA for International Application No. PCT/RU2017/000866, dated Jul. 19, 2018.

Communication pursuant to Rules 161(1) and 162 EPC for European Patent Application 17817933.9, dated Jun. 23, 2020, 3 pages.

\* cited by examiner

BLOCKCHAIN ACCESS CONTROL SYSTEM

TECHNICAL FIELD

This disclosure relates to blockchain technology and, in particular, to blockchain and access control.

BACKGROUND

Rapid advances and the rise in popularity of blockchain technology has resulted in growing demand on the capabilities offered by distributed ledger systems. Traditional blockchain platforms provide data immutability and redundancy based on consensus protocols and cryptographic hashing. Blockchains traditionally are referred to as add only systems where the historical contents of the blockchain remain unchanged, and blockchain has been a disruptive technology due to immutability and security offered by blockchain. While traditional approaches have excelled at preserving data integrity, blockchain technology fails to offer traceable and granular control over operations, such as modifications, performed on blockchains. Moreover, the immutable nature of blockchain has made blockchain too ridged for solutions in an imperfect world prone to human errors and malicious users.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
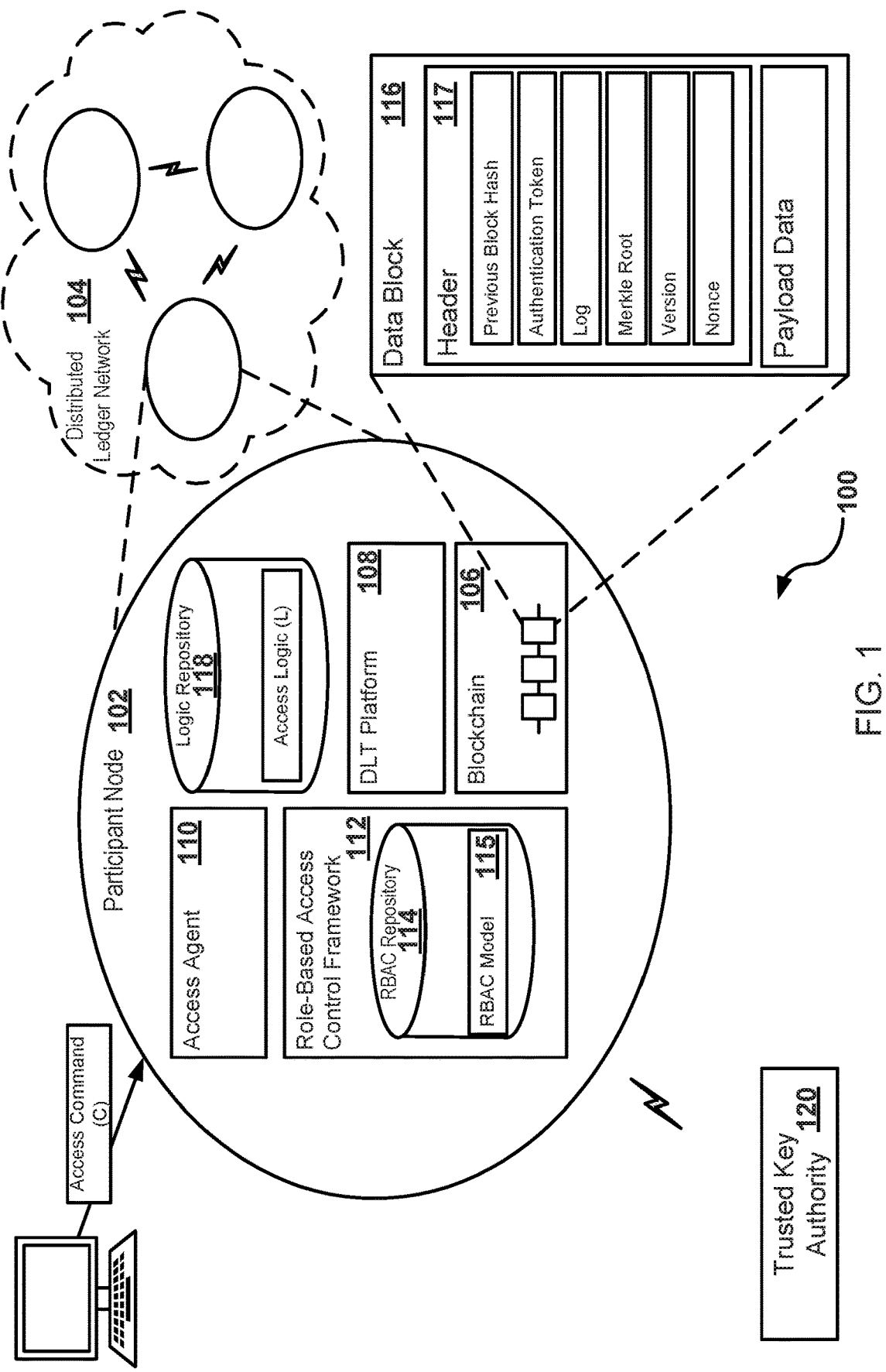
FIG. 1 illustrates a first example of a system.

Systems and methods for integrated role-based access control (RBAC) of blockchains are described herein. By way of an introductory example, a system may receive a credential token and an access command. The access command may identify access logic to modify a datablock of a blockchain. The credential token may be mapped to a role token included in a role-based access control model. The system may execute a role-based access control framework to confirm the access command to modify the datablock is authorized. For example, the system may identify an authorization token in the role-based access control model, and the system may determine the role token is mapped to the identified authorization token in the role-based access control model. The system may confirm the datablock includes the identified authorization token. The system may validate the identified authorization token. The system may authorize execution of the access logic in response to the access command being authorized by the role-based access control framework, and validation of the identified authorization token included in the datablock.

An example of a technical advancement achieved by the systems and methods described herein is the role-based access control framework may be integrated with chain-based authorization to provide block-wise authentication. For example, block headers may include authentication info, which is validated before granting access. An RBAC framework may provide granular, role-based authorization management. For example, an RBAC framework may provide authorization tokens, which are part of an RBAC model for controlling access to various computer resources. The authorization tokens of the RBAC model may be stored on a blockchain at the datablock level to provide granular governance of datablock access. The authorization tokens may be added to the datablocks each time a block is created and/or added to a blockchain. Accordingly, each datablock of the blockchain may include its own set of authorizations and/or inherit authorizations from a previous datablock, such as a genesis datablock.

Another example of a technical advancement provided by the system and methods described herein is increased security with decreased authentication time for blockchain access. Since the datablocks in the blockchain carry the security credentials for granting access to the blockchain, vulnerabilities to malicious attacks are significantly reduced over traditional approaches that rely on external policies and/or external communications for authentication. Storing the security credentials in a block header provides tamper resistance since the block is secured by cryptographic hash. Moreover, the time to perform authentication is reduced because authorization can be performed locally without performing external calls, which are subject to high latency. For example, authentication of blockchain access can be performed based on an RBAC system of an operation system and the authorization token, which is locally stored on the blockchain.

Another example of a technical advancement provided by the system and methods described herein is scalable blockchain security. For example, as users and capabilities evolve over time, the RBAC framework may change the credential tokens and/or capability tokens associated with an authorization token for accessing a blockchain. For example, RBAC framework may provide interfaces to add modify and/or remove credentials, capabilities, resources, and authorizations. Thus, credential tokens for users may be added and/or removed from an RBAC model instead of the blockchain, and changes to user access may mandated and enforced without changing the underlying blockchain. Thus, an array of roles and granularity on authorizations to gain access to the blockchain may be added and maintained over time. The scalability can be achieved at both vertical and horizontally levels in the system.

Another example of a technical advancement achieved by the system and methods described herein is access to blockchains and/or datablocks may be tracked and verified on-chain and with the data that was edited. For example, as a datablock is edited, the log entries may be added to a header of the datablock. The log entries may be signed based keys associated with particular credentials. Accordingly, the log entries may provide a historical record of modifications that are traceable and verifiable. Additional or alternative technical advancements are made evident by the systems and methods described herein.

FIG. 1 illustrates a first example of a system 100. The system 100 may include a participant node 102 of a distributed ledger network 104. The participant node 102 may include a blockchain 106. The participant node 102 may communicate with other participant nodes of the distributed ledger network 104 to validate and/or synchronize the blockchain 106. The participant node 102, and the other participant nodes of the distributed ledger network 104, may include a distributed ledger technology (DLT) platform 108.

The distributed ledger network 104 may include a plurality of participant nodes that respectively communicate based on a consensus protocol to access, submit, modify, and/or remove information stored on local instances of a blockchain 106. For example, each of the participant nodes may include a full or partial copy of the blockchain 106 (e.g. a local blockchain). The participant nodes of the distributed ledger network 104 may submit transactions to the DLT platform 108. The consensus protocol of the DLT platform 108 may determine whether to append the transaction to local instances of the blockchain 106. The consensus protocol may prevent modification to previously appended or existing information in the blockchain 106. In some DLT platforms, modifications to the blockchain 106 may be prohibited unless a majority, or some other predefined portion, of the participant nodes consent to the modifications.

The blockchain 106 may include datablocks that are linked according to a cryptography. The arrangement of datablocks and associations between information stored in the datablocks are established by the DLT platform 108. For example, the blockchain 106 may provide a growing, shared digital data flow, which serves as the source of truth between the participant nodes of a distributed ledger network 104. Depending on the DLT platform 108, the datablocks of the blockchain 106 may include a genesis datablock that is the initial datablock of the blockchain 106. Successive datablocks may be appended to the blockchain 106 over time. The blockchain 106 may provide a chronological ledger of information. One or more of the successive datablocks may include a hash of a previous datablock, a hash of a header of the previous datablock, and/or a hash of portions of the previous datablock, depending in the DLT platform 108. Modifications to one or more datablocks in the blockchain 106 may cause inconsistencies in the hashed information stored in the successive datablocks. The inconsistencies may be detected by the participant nodes of the distributed ledger network 104.

In examples where editable blockchains are desirable, the internal consistency and consensus among participants may be preserved by various techniques, such as the chameleon hash function, which maintains the integrity of the blockchain 106 after a datablock is edited. The chameleon hash function is described in U.S. Pat. No. 9,774,578B1—Distributed Key Secret for Rewritable Blockchain, which is hereby incorporated by reference.

The DLT platform 108 may include a blockchain framework. The DLT platform 108 may implement and/or validate the blockchain 106 based on consensus among participant nodes of the distributed ledger network 104. The participant node 102 may locally implement an instance of the DLT platform 108. The local instance of the DLT platform 108 may communicate with other instances of the DLT platform 108 in the distributed ledger network 104. The DLT platform 108 may cause the participant node 102 to participate in the distributed ledger network 104. For example, the DLT platform 108 may cause the participant node 102 to synchronize changes to the blockchain 106 with remote blockchain(s) on other participant nodes such that each participant node includes update-to-date blockchains. Alternatively or in addition, the DLT platform 108 may provide user interfaces, application programming interfaces (APIs), services related to management of the blockchain 106 (or blockchains). Examples of the DLT platform 108 may include Hyperledger, Ethereum, and/or other custom developed implementations.

The participant node 102 may include a blockchain access agent 110 (hereinafter referred to as an access agent). The access agent 110 may access the blockchain 106 and/or information stored on the blockchain 106. As described herein, access refers to read, write, update. Accordingly, the access agent 110 access the blockchain 106 by reading information from the blockchain 106, writing to the blockchain 106, updating information on the blockchain 106, deleting information from the blockchain 106.

In some examples, the access agent 110 may invoke an access command C, which can be a tool in binary format. The access command C may include a request, instruction and/or command sent over a communication channel or interface by a user of the system. For example, the access command C may include a command line operation, a request passed via application programming interface (API), a message sent over a message broker, or any other instruction. The access command C may include (or may be communicated with) parameters to cause the access agent 110 to interact with the blockchain 106 and/or DLT platform 108. In some examples, the access agent 110 may modify the blockchain 106, and/or datablock(s) included in the blockchain 106, based on the access command C and/or parameters communicated with the access command C.

The access command C may be associated with access logic L. The access logic L may include instructions executable to carry out the access command C. In some examples, the access logic L may include a binary or compiled set of instructions that is addressed and/or identified based on information included in the access command C. For example, the access command C may include a parameter which identifies the access logic L. By way of example an access command, or a portion there of, may include "/usr/bin/bceditor." The term "bceditor" may refer to label for access logic L identified as "bceditor".

The participant node 102 may govern access to the blockchain 106 with the role-based access control framework 112. For example, the participant node 102 may include an RBAC framework 112. The RBAC framework 112 may restrict or permit access to computer resources, such as the access logic L. In some example, the RBAC framework 112 may operate, at least partially, within a kernel space or privileged space of an operating system to determine whether access to computer resources are permitted or denied. Alternatively or in addition, an operating system may include the RBAC framework 112. For example, the RBAC framework 112 may include RBAC provided by various Linux distributions, Microsoft WINDOWS, and other operating systems.

The RBAC framework 112 may include an RBAC repository 114. The RBAC repository 114 may include a storage. For example, the RBAC repository 114 may include a relational or non-relational database. The RBAC repository 114 may store an RBAC model 115.

The RBAC model 115 may include a set of tokens, and relationships between tokens, that define permissions (or lack of permissions) between computer resource capabilities and end-users (both machine and human). The RBAC model 115 may include mappings between the tokens. Alternatively or in addition, the RBAC model 115 may include an inheritance model where a token may inherit the attributes of other tokens. The tokens of the RBAC model 115 may include a resource token, a capability token, an authorization token, a role token, and/or a credential token.

A resource token may include an identifier of a computer resource and/or a command to access a computer resource. As described herein, a computer resource refers to any physical or virtual component, portion of memory, and/or set of logic, such as the access logic L. For example, the resource token may include a name of a resource, a key associated with the resource, and/or any other information that identifies a computer resource or computer resources. By way of example, the access agent 110, or logic invoked by the access agent 110, may be associated with the resource token "/usr/bin/bceditor."

A capability token may refer to a security attribute representative of a capability. The capability token may include an identifier such as a label, key, or some other value that identifies a capability in the RBAC model 115. The capability token may be mapped to a resource token and represent a capability of the computer resource corresponding to the resource token. Alternatively or in addition, the capability token may be mapped to authorization token and represent an authorized capability associated with the authorization token.

An authorization token may include an identifier of a privilege or permission, or lack of permission. The authorization token may represent a permission, or lack of privilege, to access a computer resource. Alternatively or in addition, the authorization token may represent a permission (or lack of permission) to access particularly capabilities of a computer resource. The authorization token may be mapped to one or more capability token(s). By way of example, Table 1 includes a mapping between the resource token "/usr/bin/bceditor," the capability tokens "CAP_WRITE, CAP_NETWORK," and the authorization tokens "os.bc.write, os.network."

TABLE 1

| Command Name = /usr/bin/bceditor |
| AuthTokens = os.bc.write, os.network |
| Capabilities=CAP_WRITE, CAP_NETWORK |

The data structure of Table 1 is an example and other data structures to establish the mappings of the RBAC model 115 are possible. For example, the authorization tokens, command tokens, and/or capability tokens may be stored in separate tables and associated via one-to-one, one-to-many, and/or many-to-many relational mappings.

The role token may include an identifier for a role in an RBAC framework 112. For example, the role token may include an identifier for a role such as "BC Admin". In some examples, some roles may inherit attributes of other roles. For example, an operating system may include a "super user", "privileged user", or the like, that inherits the authorizations associated with multiple roles. A role token may be mapped to one or more authorization tokens. In addition, a role token may be mapped to one or more credential tokens.

A credential token may include an identifier of an entity, such as a user or machine. The credential token may include, for example, a username or access name. The credential may further include, or be associated with, a password, key, certificate, or some other authentication information that identifies an entity (human, machine, biometrics, or otherwise). A credential token may be mapped to a role token and/or an authorization token. For example, the credential token may be mapped to role token and the role token may be mapped to an authorization token. Alternatively or in addition, the credential token may be mapped directly to an authorization token. Table 2 provides examples of a mapping between a credential token(s), a role token(s) and/or an authorization token(s) token.

TABLE 2

| User ID | Role | Authorization Tokens |
| --- | --- | --- |
| Ruby | BC Admin | os.bc.write, os.network |

The data structure of Table 2 is an example and other data structures to establish the relationships of the RBAC model 115 are possible. For example, the credential tokens, role tokens, and authorization tokens may be stored in separate tables and associated via one-to-one, one-to-many, and/or many-to-many relationships.

The blockchain 106 may include information from the RBAC model 115. For example, one or more datablocks of the blockchain 106 may store token(s) from the RBAC model 115.

For example, a datablock 116 of the blockchain 106 may include a header 117 and a payload. The header 117 may include summary information or metadata information corresponding to the datablock 116. The header 117 may include a previous hash of a previous datablock, a merkle root, a version, a time stamp information, a nonce, and/or other information, depending on the blockchain implementation. In some examples, the DLT platform 108 may identify the header 117 based on the address of the datablock 116. Alternatively or in addition, the header 117 may be extracted from the datablock 116 based on a format definition or schema. The payload of the datablock may include transaction information. For example, the payload may include one or more transaction(s) and the header may include information descriptive of the transaction(s).

The header 117, or portions of the datablock 116 other than the payload, may include RBAC information. For example, the header may include RBAC tokens such as one or more credential token, one or more role token, one or more authorization token, and/or one or more capability token. The access agent 110, or access logic L invoked by the access agent 110, may determine whether a credential is associated with one or more of the tokens stored in the header based on the RBAC model 115. For example, the RBAC framework 112 may determine that the access command C received under a particular credential token. The RBAC framework 112 may determine that the credential is mapped with a role token. The role token may be further mapped to an authorization token. The access agent 110, and/or the access logic L invoked by the access agent 110, may obtain the authorization token and determine whether the authorization token is stored in the header of the datablock 116. The blockchain 106 may permit access (i.e. read, write, update) in response to the authorization token being included in the header.

In some examples, the header of the datablock 116 may also include a log in addition to the authorization token. The log may include a historical log of access to the datablock 116. The log may include time information, credential information, access type information, and other information that describes who, when, where, and/or how the datablock 116 was accessed. For example, the log may include one or more log entries indicative of the type of access, such as read, write, and update. The entries may include the credential token and/or other token information associated with the credential token asserted to access the blockchain 106.

In some examples, the participant node 102 may include a logic repository 118. The logic repository 118 may include a storage, a file system, and/or one or more memory locations that store access logic or sets of access logic. In an example, the access logic L may include a complied binary, such as an executable file. The logic repository may store the access logic L and/or sets of logic.

The logic repository 118 may store multiple sets of access logic. Each set of access logic may be associated with an access command, a resource token, capability tokens, and/or other tokens of the RBAC model 115. Accordingly the logic repository 118 may be searched to identify the access logic L based on the access command C. Alternatively or in addition, the logic repository may be searched to identify one or more resource tokens and/or capability tokens for the access logic. In other examples, the RBAC repository 114 may store associations between RBAC tokens of the RBAC model 115 and the sets of access logic stored in the logic repository 118.

The system may include a trusted key authority 120. The trusted key authority 120 may include a source of one or more keys, such as public keys. The trusted key authority 120 include one or more repositories that store the keys. The keys may be associated with identifiers of trusted authorities. The trusted authorities may include, for example, entities (either machines or humans). For example, the trusted key authority 120 may store a mapping between a public key and an identifier (e.g. an IP address, MAC address or the like) of a participant node 102, and/or one or more tokens of the RBAC model 115, such as the credential token, the role token, or other tokens.

Figure 2:
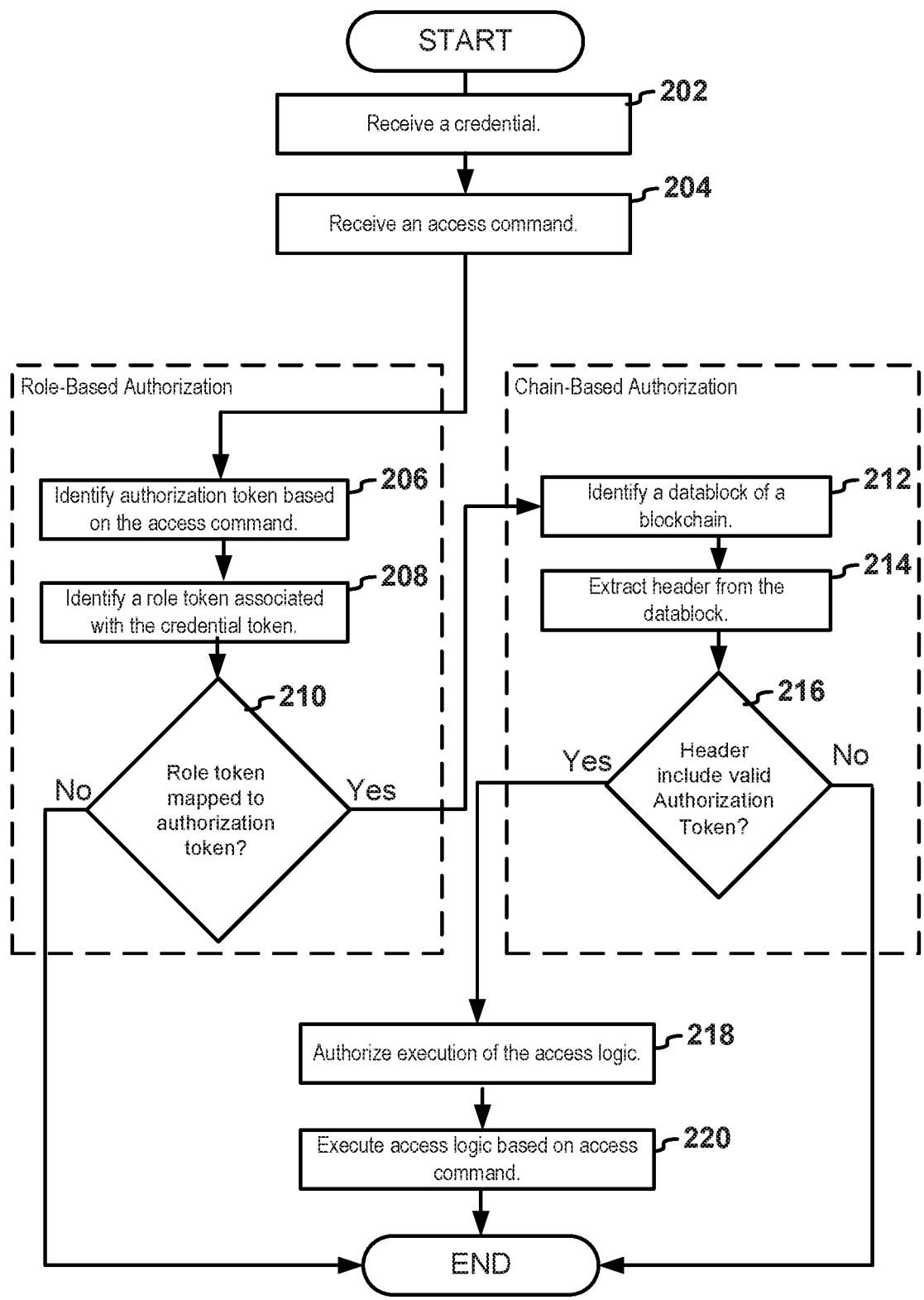
FIG. 2 illustrates a first example of logic for a participant node.

FIG. 2 illustrates a first example of logic for the participant node 102. The participant node 102 may receive a credential token (202). The participant node 102 may receive an access command (204).

The access command and/or the credential may be received by the participant node 102 in various manners. For example, the access command and/or credential may be entered into a command interface, communicated via a network interface, or provided to the participant node 102 via various communication channels and/or input channels. Alternatively or in addition, an operating system may attempt to launch a process, thread, or other resource to execute the access logic L in response to receipt of the access command and/or credential. In other examples, the access agent 110 may receive the access command, and the RBAC framework 112 may prompt for the credential. By way of an example, the credential may be provided to the participant node 102 by way of a "su" operation or switch user or through RBAC framework and the access command may include a command to launch an executable stored in a file system (e.g. /usr/sbin/bceditor).

In some examples, the participant node 102 may establish an authenticated session in response to receiving the credential. The authenticated session may include information representative of a user or machine logging into a device or system, such as an operating system. Alternatively or in addition, the authenticated session may include information representative of network authentication based on a security protocol (e.g. Secure Sockets Layers (SSL), Transport Layer Security (TSL), directory service or some other suitable protocol). In general, the authentication session may include information generated based on security logic that initializes and/or maintains authentication of a credential. In some examples, the authentication session may be valid over a limited time duration.

The participant node may determine whether role-based authorization exists for execution of the access command (206-210). The role-based access control may be performed by the RBAC framework 112. Alternatively or in addition, the role-based access control (e.g. operations 206-210) may be performed by the kernel of an operating system. For example, the RBAC framework 112 may include logic executable by the kernel in a privileged kernel space of memory.

To determine whether the role-based authorization exist, the RBAC framework 112 may identify an authorization token based on the access command C (206). In some examples, the authorization token may be mapped directly to the access command in the RBAC model 115. Alternatively or in addition, the access command may C (and/or the access logic L corresponding the access command C) may be represented by a particular resource token. The RBAC framework 112 may identify one or more capability tokens mapped to the resource token. The RBAC framework 112 may identify one or more authorization tokens mapped the identified capability token. In examples where the RBAC repository 114 is relational, the RBAC framework 112 may query the RBAC repository 114 for the authorization token based on query parameters such as the capability token and/or the resource token.

The RBAC framework 112 may identify a role token associated with the credential token (208). For example, the RBAC framework 112 may determine that the role token is mapped to the credential token in the RBAC model 115.

The RBAC framework 112 may determine whether the identified role has authorization to perform the command (210). For example, after the RBAC framework 112 has identified the capabilities tokens associated with the access command, and the role of the credential invoking the access command, the RBAC framework 112 may determine whether authorization exists. In other words, the RBAC framework 112 may determine whether the RBAC model 115 includes a mapping between the role token and the authorization token.

In response to the role token not being mapped to the authorization token (210, NO), the participant node 102 may deny access to the blockchain 106 and/or deny execution of the access logic L corresponding to the access command C.

In response to the role token being mapped to the authorization token (210, YES), the participant node 102 may perform chain-based authorization (212-216). The chain-based authorization may be performed by the access agent 110.

To perform the chain-based authorization, the access agent 110 may identify a datablock 116 of the blockchain 106 (212). For example, the access agent 110 may extract an address of the blockchain 106, one or more datablock, a transaction, or other information that provides the location of a blockchain or information stored on the blockchain 106. In some examples, the access command C may include (or be communicated with) a parameter that is indicative of the blockchain 106 (or multiple blockchains), the datablock 116 (or multiple datablocks), and/or a transaction (or multiple transactions). The access agent 110 may extract the parameter from the access command C.

The access agent 110 may extract a header from the datablock 116 (214). The access agent 110 may determine whether the authorization token is included in the header (216). For example, the access agent 110 may determine whether the authorization token previously identified by the RBAC framework 112 is included in the header of the datablock 116. The authorization token may have been previously included in the datablock 116 when the datablock 116 was created to establish the authorizations required to edit the datablock 116. Accordingly, the access agent 110 may determine whether to authorization(s) associated with a credential (or a role of a credential) match the authorization(s) stored in the RBAC data of the datablock 116.

In some examples, the authorization token may be digitally signed. For example, RBAC data in header of the datablock 116 may include a digitally signed authorization token (e.g., a hash). The participant node 102, or some other authorized node, may digitally sign the authorization token based on public and private key pair. The public key of the authorized node may be accessed to verify the signatory of the authorization token. The key authority 120 may store the public key and make the public key available. The public key may be associated with an identifier (such as IP address) of the participant node 102 and/or a credential token.

Accordingly, determination of the validity of the authorization token may involve determining whether the authorization token is validly signed. For example, the access agent 110 may determine whether a hash of the authorized token was generated by an authorized entity. For example, access agent 110 may determine whether the authorization token is digitally signed based on a public key associated with a credential token and/or participant node. In some examples, the access agent 110 may obtain the public key from the key authority 120 based on an identifier of the participant node (.e. IP address, MAC address, computer name, etc.), the credential that is invoking the access logic, and/or other relevant identifying information.

In response to the header not including a valid authorization token in the header (216, NO), deny the access command. For example, the access agent 110 may generate an error message and abort execution of the access logic L or restrict invoking the access logic L corresponding to the access command C.

In response to the header including a valid authorization token in the header (216, YES), the access agent 110 may authorize execution of the access logic (218). For example, the access agent 110 may authorize execution of the access logic in response to satisfaction of additional or alternative criteria. For example, the access agent 110 may authorize execution of the access logic in response to the rule token being mapped to the identified authorization token in the RBAC model 115, the identified authorization token being included in the header of the datablock 116, and/or the datablock 116 including a valid digital signature. Alternatively or in addition, access agent 110 may permit execution of the access logic in response to the authorization token being included in the header of the datablock 116. The access agent 110 may invoke the access logic based on the access command with a credential. The RBAC framework 112 may permit and/or restrict execution of the access logic, depending on whether the role token for the credential is associated with the authorization token.

The access agent 110 may execute the access logic L based on the access command C (220). For example, access agent 110 may identify the access logic L associated with the access command C. The agent may cause execution of the access logic L. The access logic may cause the DLT platform 108 to perform a read, write, or some other operation on the datablock 116 of the blockchain 106. In some examples, the access command may include, or be submitted with, update data. Execution of the access logic may cause the datablock 116 to be modified based on the update data.

Figure 3:
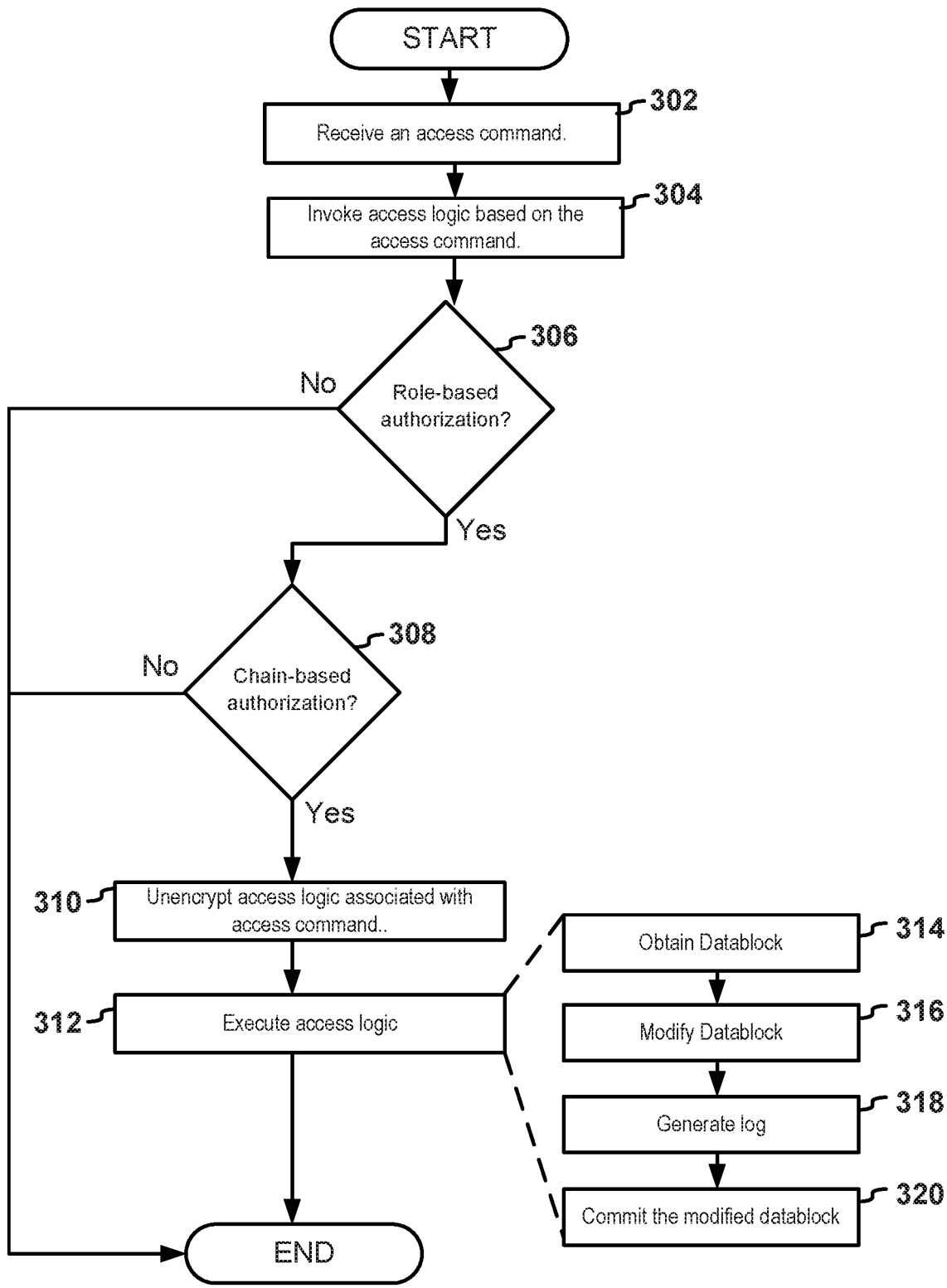
FIG. 3 illustrates a second example of logic for a participant node.

FIG. 3 illustrates a second example of logic for the participant node 102. The access agent 110 may receive an access command (302). The access command may correspond to the access logic L. In some examples, the access agent 110 may receive a credential. Alternatively, the access command may access the credential.

The access agent 110 may invoke the access logic based on the access command (304). For example, the access agent 110 may communicate a request to an operating system to allocate computer resources to execute the access logic corresponding to the access command C. In some examples, the access agent 110 may perform a system call. The system call may include a procedural call performed under an authenticated session.

The RBAC framework 112 may determine whether role-based authorization exists for executing the access logic (306). Operations 206-210 of FIG. 2 and the related discussion further describes an example of role-based authorization. The access agent 110 may determine whether chain-based authorization exists for executing the access logic L (308). Operations 212-216 of FIG. 2 and the related discussion further describes examples of chain-based authorization.

In response to determination of role-based and chain-based authorization, the access agent 110 may unencrypt the access logic L (310). For example, the access logic may have been previously encrypted based on a key. The key may be accessible to an authorized entity such as the participant node 102 or some other participant node of the distributed ledger network 104. Alternatively or in addition, the key may be accessible to an entity associated with a credential token. The credential token may be stored in the RBAC repository 114 of one or more participant nodes. The access agent 110 may access an encrypted access control logic. The access agent 110 may unencrypt the access control logic based on the key.

The access agent 110 may execute the access logic 312. For example, in response to establishing role-based and chain-based authorization, the access agent 110 may execute the access logic. Alternatively or in addition, the kernel operating system kernel may allocate computer resources, such as threads, processes, or the like to cause the access logic to be executed. The threads, processes may be authorized to execute the authorization logic based on the credential. The access logic may cause various types of read and/or write operations to one or more datablocks stored on the blockchain 106. By way of example, the access logic may include of the operations 314-320

For example, the access logic may cause the access agent 110 to obtain the datablock 116 (314). In some examples, the access command may include parameters that identify the datablock 116, or a transaction of the datablock 116. The access agent 110 may communicate with the DLT platform 108 to identify the datablock 116 based on the parameter(s) of the access command.

The access logic may cause the access agent 110 to modify the datablock 116 (316). For example, the access command may include one or more parameters that include modification data. The modification may include updated transaction information and/or other information included in the datablock 116.

The access logic may cause the access agent 110 to generate a log of the modification (318). The log may include a log entry that identifies the details of the log, as previously described in reference to FIG. 1. For example, the log may include the credential of the user that performed the modification, the data/time the modification occurred, a description of the modification, and/or other relevant information. In some examples, the log may include a digital signature of the participant that performed the modification. The digital signature may be signed based on a private key associated with the participant node 102 and/or a credential of the RBAC framework 112. The participant node 102 may include the log in the header of the modified datablock.

The access logic may cause the access agent 110 to commit the modified datablock (320). For example, the participant node 102 may replace the previous datablock with the updated datablock. Alternatively, the participant node 102 may update information stored at the memory location(s) of the datablock 116. In some examples, the access agent 110 may communicate with the DLT platform 108 to commit the modified datablock. Alternatively or in addition, the access agent 110 may communicate with the blockchain 106 directly.

Figure 4:
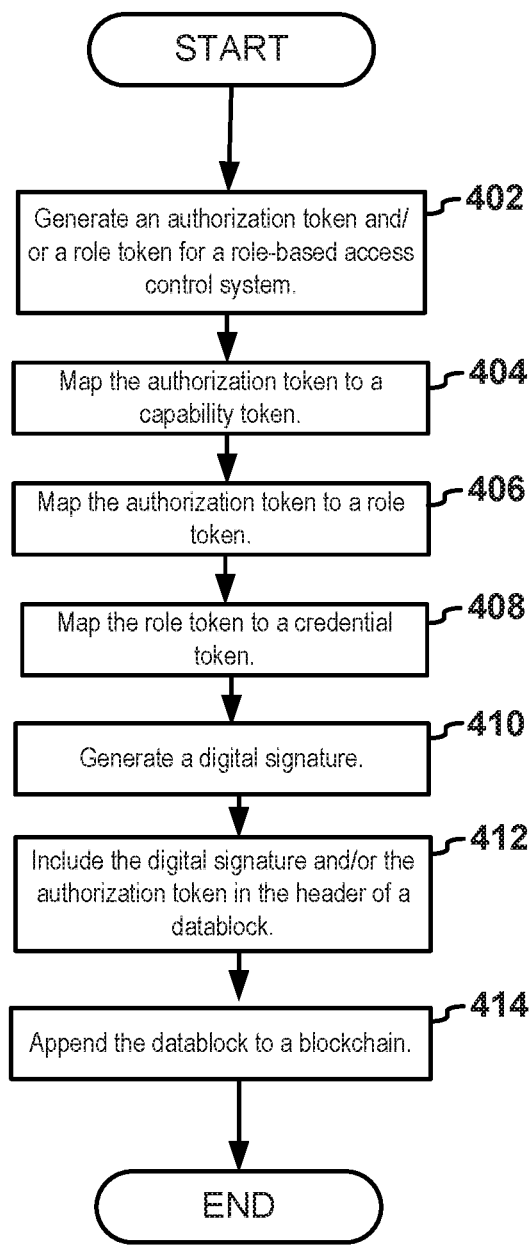
FIG. 4 illustrates a third example of logic for a participant node.

FIG. 4 illustrates a third example of logic for a participant node. The RBAC framework 112 may generate an authorization token for the RBAC framework 112 (402). For example, the participant node 102 may receive a request to generate the authorization token and/or a role token. In some examples, the request may be performed by a super user or by a user associated an administrative role. The RBAC framework 112 may insert the authorization token into the RBAC repository 114.

The RBAC framework 112 may map the authorization token to a capability token (404). For example, the capability token may representative of an operational capability, such as read, write, edit, append, etc. Accordingly, the mappings between the authorization token, capability token, and resource token may permit performance of particular operations on the blockchain 106, such as edit, read, write, append, or other relevant operations. Depending on the implementation, other examples of capability tokens are possible. For example, the capability token be generic or specific to blockchain. In an example, the capability may include "edit blockchain" and the resource token may refer to a particular blockchain and/or DLT platform 108.

Table 3 shows examples of logic to generate authorization tokens and map the authorization tokens to capability tokens.

TABLE 3

$ /usr/bin/addauth auth-name="os.bc.write"
$ /usr/bin/addauth auth-name="os.bc.write.india" CAP_WRITE
$ /usr/bin/addauth auth-name="os.bc.write.usa" CAP_WRITE
$ /usr/bin/addauth auth-name="os.bc.write.eu" CAP_WRITE As shown in Table 3, the authorization token "os.bc.write.india", "os.bc.write.usa" and "os.bc.write.eu" are each mapped to "CAP_WRITE." Each of these authorization tokens inherit "os.bc.write".

The RBAC framework 112 may map the authorization token to a role token (406). The role token may be mapped to one or more credential tokens. By mapping the role token to the authorization token, the RBAC framework 112 may permit a credential associated with the role to perform the authorized capabilities.

By way of example, the authorization tokens shown in Table 3 are mapped to role tokens based on the logic shown in Table 4.

TABLE 4

$ /usr/bin/addrole role="Blockchain-Manager"
authorization="os.bc.write"

TABLE 4-continued $ /usr/bin/addrole role="Blockchain-Manager"
authorization="os.bc.write.india"

The logic shown in table 4 establishes a mapping between the role token "Blockchain-Manager" and the authorization tokens "os.bc.write" and "os.bc.write.india".

RBAC framework 112 may map the authorization token to a credential token (408). For example, the RBAC framework 112 may receive a command to establish an association between the credential token and the authorization token. By way of example, the logic of Table 5 establishes a mapping between the role token "Blockchain-Manager" and the credential token "ruby".

TABLE 5

$ /usr/bin/chuser attribute=role role-name="Blockchain-Manager" ruby

Based on the aforementioned example, the user "ruby" will have security credentials and RBAC capabilities that permit ruby to invoke the access command "bceditor". On execution of access logic for "bceditor," the role token associated with ruby will be verified by the RBAC framework 112. In the present example, user ruby's role is mapped to an authorization for the capability "CAP_WRITE" which is mapped to the access command "bceditor." On verification by the RBAC framework 112, grant access is provided to user "ruby", which allows her to edit the blockchain 106 via the access logic for "bceditor."

The RBAC framework 112 may generate a digital signature (410). For example, the RBAC framework 112 may access a private and public key pair. The private key may be privately accessible to the participant node 102 while the public key may be publically accessible. The participant node 102 may generate a hash of the authorization token based on the private and public key pair. Alternatively or in addition, the hash may include a hash of time information, IP address information, the authorization token, and/or other relevant information that certifies the authorization token being included in the header of the datablock 116 by the participant node. Based on the public key, the digital signature may be verified to assert that the digital signature was signed by the participant node.

The participant node may include the signed authorization token and/or the authorization token in the header of the datablock 116. For example, the participant node 102 may include the digital signature and/or the authorization token to the DLT platform 108 with the instruction to generate the datablock 116. Alternatively or in addition, the access agent 110 may communicate transaction information to the DLT platform 108 to include in the datablock 116. The transaction information may include the digital signature and/or the authorization token.

The participant node 102 may append the datablock 116 to the blockchain 106 (414). In some examples, the datablock 116 may be the genesis datablock of the blockchain 106. In such examples, the authorization tokens may apply to the entire blockchain. Thus, access to subsequent datablocks added to the blockchain 106 may be governed based on the authorization token(s) in the header of the datablock 116. Alternatively or in addition, each datablock may include an authorization token. In some examples, the authorization token included in subsequent datablocks may be a child of the authorization token in the genesis datablock or a different authorization token(s) as well to govern edit permission of the current block chain.

The DLT platform 108 may communicate transaction information, and other information stored in the datablock 116, to other blockchain participants as part of a consensus protocol. When consensus is reached, the DLT platform 108 of the participant node 102 (and the other participant nodes) may append the datablock 116 to the blockchain 106.

The logic illustrated in the flow diagrams may include additional, different, or fewer operations than illustrated. Moreover, the system 100 may be implemented with additional, different, or fewer components than illustrated. Each component may include additional, different, or fewer components.

Figure 5:
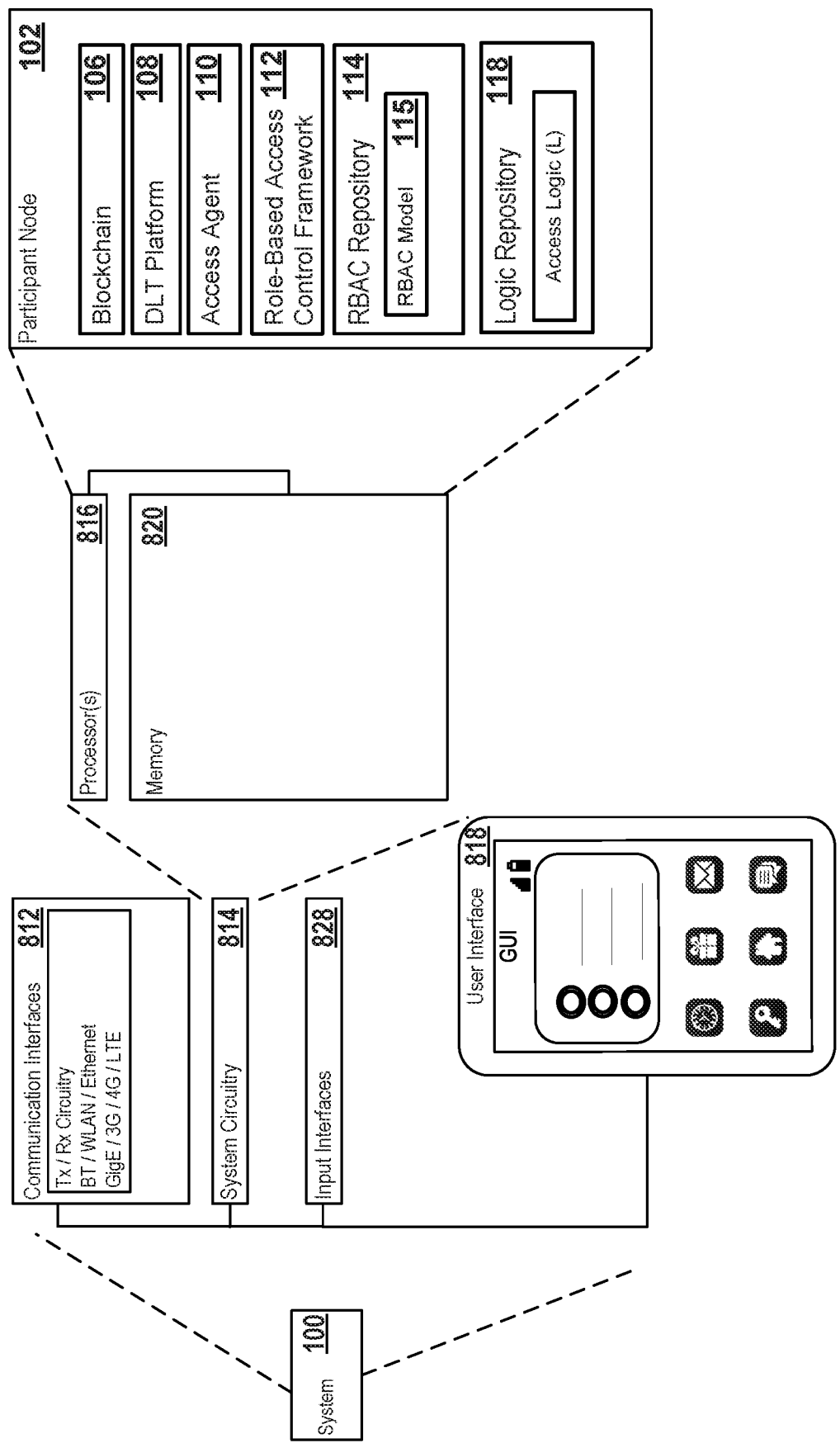
FIG. 5 illustrates a second example of a system.

FIG. 5 illustrates a second example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform the operations the blockchain 106, the DLT platform 108, the access agent 110, the role-based access control framework 112, the RBAC repository 114, the RBAC model 115, the logic repository 118, the access logic L, the participant node 102, and/or the system 100. The computer code may include instructions executable with the processor 816.

The memory 820 may be any device for storing and retrieving data or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least one of the blockchain 106, the DLT platform 108, the access agent 110, the role-based access control framework 112, the RBAC repository 114, the RBAC model 115, the logic repository 118, the access logic L, the participant node 102, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the blockchain 106, the DLT platform 108, the access agent 110, the role-based access control framework 112, the RBAC repository 114, the RBAC model 115, the logic repository 118, the access logic L, the participant node 102, the system 100, and/or any component or subcomponent of the system 100. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A participant node of a distributed ledger network, the participant node comprising:
   a blockchain comprising a plurality of datablocks previously stored therein;
   a role-based access control framework configured to access a role-based access control model to provide role-based authorization; and
   a processor circuitry, the processor circuitry configured to:
   receive a credential token and an access command, the access command identifying access logic to modify a datablock previously stored within the blockchain, the credential token being mapped to a role token included in a role-based access control model;
   determine the role-based access control framework authorizes the access command to modify the datablock, by:
   identification of an authorization token in the role-based access control model, and
   determination of the role token being mapped to the identified authorization token in the role-based access control model;
   extract, from the access command, a parameter indicative of a location of the blockchain storing the datablock;
   extract, from a header of the datablock, information to confirm the datablock is storing the identified authorization token;
   validate the identified authorization token; and
   authorize execution of the access logic in response to:
   the access command being authorized by the role-based access control framework, and
   validation of the identified authorization token included in the datablock.

2. The participant node of claim 1, wherein to access the datablock and confirm the datablock includes the identified authorization token, the processor circuitry is further configured to:
   extract a header from the datablock; and
   determine the header includes the identified authorization token stored therein.

3. The participant node of claim 1, wherein the processor circuitry is configured to validate the identified authorization token in response to the identified authorization token being digitally signed based on a public key associated with a trusted authority.

4. The participant node of claim 1, wherein the processor circuitry is further configured to:

execute the access logic to modify the datablock in response to the execution being authorized.

5. The participant node of claim 4, wherein the processor circuitry is further configured to:
modify, based on the access logic and the access command, the datablock; and
commit the modified datablock to the blockchain.

6. The participant node of claim 5, wherein the processor circuitry is further configured to:
generate a log entry indicative of modification to the datablock, the log entry comprising the credential token, a digital signature, a time value, a description of the modification to the log entry, or any combination thereof; and
include the log entry in the modified datablock as a historical record of modification of the datablock.

7. The participant node of claim 1, wherein the processor circuitry is further configured to:
access, in response to the role token being mapped to the identified authorization token, an encrypted access control logic; and
unencrypt the encrypted access control logic based on a key associated with the credential token.

8. The participant node of claim 1, wherein the processor circuitry is further configured to:
modify the datablock using the access logic;
store a record of modification in the modified datablock; and
synchronize, based on a consensus protocol of a distributed ledger network, the blockchain with a corresponding remote blockchain stored on another participant node of the distributed ledger network to update the corresponding remote blockchain with the modified datablock.

9. The participant node of claim 1, wherein the processor circuitry is further configured to:
receive transaction data to store on the blockchain;
generate a new datablock;
include the authorization token in the new datablock; and
commit the new datablock to the blockchain.

10. The participant node of claim 9, wherein the authorization token is stored in a header of the new datablock.

11. A method, comprising:
receiving, by a processor circuitry, a credential token and an access command, the access command identifying access logic to modify a datablock previously and permanently stored in a blockchain, the credential token being mapped to a role token included in a role-based access control model, wherein a role-based access control framework accesses the role-based access control model;
executing, with the processor circuitry, a role-based access control framework to confirm the access command to modify the datablock is authorized by:
identifying, with the processor circuitry, in the role-based access control model, an authorization token mapped to or representing the access command, the authorization token included in the role-based access control model, and
confirming, with the processor circuitry, the role token is mapped to the identified authorization token in the role-based access control model;
obtaining, with the processor circuitry, the datablock from the blockchain;
determining, with the processor circuitry, the identified authorization token is also stored in a header of the datablock;
validating, with the processor circuitry, the identified authorization token; and
authorizing, with the processor circuitry, execution of the access logic in response to:
the access command being authorized by the role-based access control framework, and
validation of the identified authorization token stored in the datablock.

12. The method of claim 11, wherein determining the datablock includes the identified authorization token further comprises:
extracting, with the processor circuitry, a header from the datablock; and
determining, with the processor circuitry, the identified authorization token is stored in the header.

13. The method of claim 11, wherein validating the identified authorization token further comprises:
determining, with the processor circuitry, the identified authorization token is digitally signed based on a public key associated with a trusted authority.

14. The method of claim 11, further comprising:
modifying, with the processor circuitry, the datablock based on the access logic and the access command; and
committing, with the processor circuitry, the modified datablock to the blockchain.

15. The method of claim 14, further comprising:
generating, with the processor circuitry, a log entry indicative of the modification to the datablock, the log entry comprising the credential token, a digital signature, a time value, a description of the modification to the log entry, or any combination thereof; and
including, by the processor circuitry, the log entry in a header of the modified datablock as a historical record of modification to the datablock.

16. The method of claim 11, further comprising:
receiving, with the processor circuitry, transaction data to store on the blockchain;
generating, with the processor circuitry, the datablock;
including, by the processor circuitry, the authorization token in the datablock; and
committing, with the processor circuitry, the datablock to the blockchain.

17. The method of claim 11, further comprising:
accessing, in response to the role token being mapped to the identified authorization token, an encrypted access control logic; and
unencrypt the encrypted access control logic based on a key associated with the credential token.

18. A non-transitory computer readable storage medium comprising:
instructions executable by a processor circuitry, the instructions comprising:
instructions executable by the processor circuitry to receive a credential token and an access command, the access command identifying access logic to modify a datablock permanently stored in a blockchain, the credential token being mapped to a role token included in a role-based access control model;
instructions executable by the processor circuitry to determine the access command is authorized by:
instructions executable by the processor circuitry to identify an authorization token based on the access command, the authorization token included in a role-based access control model, and instructions executable by the processor circuitry to determine the role token is mapped to the identified authorization token in the role-based access control model;

instructions executable by the processor circuitry to obtain the datablock from the blockchain;

instructions executable by the processor circuitry to extract a header from the datablock;

instructions executable by the processor circuitry to confirm the identified authorization token is stored in the header;

instructions executable by the processor circuitry to validate the identified authorization token; and instructions executable by the processor circuitry to execute the access logic to modify the datablock in response to:
- the access command being authorized by the role-based access control framework, and
- validation of the identified authorization token stored in the header of the datablock.

19. The non-transitory computer readable storage medium claim 18, wherein the instructions executable by the processor circuitry to validate the identified authorization token further comprise:

instructions executable by the processor circuitry to determine the identified authorization token is digitally signed based on a public key associated with a trusted authority.

20. The non-transitory computer readable storage medium claim 18, wherein the instructions executable by the processor circuitry to modify, based on the access logic, the datablock based on the access logic and the access command further comprise: instructions executable by the processor circuitry to generate a log entry indicative of the modification to the datablock, the log entry comprising the credential token, a digital signature, a time value, a description of the modification to the log entry, or any combination thereof;

instructions executable by the processor circuitry to include the log entry in the header of the modified datablock as a historical record of modification to the datablock; and instructions executable by the processor to commit the modified datablock to the blockchain.

21. The non-transitory computer readable storage medium claim 18, wherein the instructions executable by the processor circuitry to receive the credential token and the access command are preceded in time by initial instructions comprising:

instructions executable by the processor circuitry to receive transaction data to store on the blockchain;

instructions executable by the processor circuitry to generate the datablock;

instructions executable by the processor circuitry to store the authorization token in the header of the datablock; and instructions executable by the processor circuitry to commit the datablock to the blockchain.

* * * * *

UNITED STATES PATENT AND TRADEMARK OFFICE
CERTIFICATE OF CORRECTION

PATENT NO. : 11,201,746 B2
APPLICATION NO. : 16/529343
DATED : December 14, 2021
INVENTOR(S) : Ranganathan Page 1 of 1

It is certified that error appears in the above-identified patent and that said Letters Patent is hereby corrected as shown below:

In the Specification

Column 6, Line 1, delete "examples" and insert in its place --an example--.

Column 6, Line 3, delete "token", which is just before the ".".

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*